United States Patent

[11] 3,555,298

[72] Inventor Lewis J. Neelands
DeLand, Fla.
[21] Appl. No. 692,045
[22] Filed Dec. 20, 1967
[45] Patented Jan. 12, 1971
[73] Assignee General Electric Company
a corporation of New York

[54] ANALOG TO PULSE DURATION CONVERTER
5 Claims, 2 Drawing Figs.

[52] U.S. Cl. .......... 307/235, 307/265; 328/115, 328/146; 329/106; 340/347; 328/151; 307/251
[51] Int. Cl. .......... H03k 17/00
[50] Field of Search .......... 307/235, 228, 265; 328/115, 146, 150, 151; 330/30D; 329/106; 332/15; 340/347

[56] References Cited

UNITED STATES PATENTS

| | | | |
|---|---|---|---|
| 2,897,486 | 7/1959 | Alexander et al. | 340/347 |
| 3,105,939 | 10/1963 | Onno et al. | 328/146X |
| 3,201,703 | 8/1965 | Becker | 328/151X |
| 3,207,998 | 10/1965 | Corney et al. | 328/151X |
| 3,348,065 | 10/1967 | Schmidt | 307/235X |
| 3,429,993 | 2/1969 | Bartz | 328/151X |
| 3,449,741 | 6/1969 | Egerton, Jr. | 328/151X |

OTHER REFERENCES

Fiorino and Brunschweiger, " Variable Frequency Sawtooth Generator," IBM Technical Disclosure Bulletin, Vol. 5 No. 3, Aug. 1962

*Primary Examiner*—Donald D. Forrer
*Assistant Examiner*—R. C. Woodbridge
*Attorneys*—Raymond H. Quist, Allen E. Amgott, Henry W. Kaufmann, Melvin M. Goldenberg, Frank L. Neuhauser and Oscar B. Waddell

ABSTRACT: A capacitor is charged to the voltage level of an analogue signal to be converted. The capacitor is linearly discharged by a constant current with the resulting voltage ramp applied as one input to a comparator. The comparator output changes state when the voltage ramp passes through a reference voltage applied to the other input. The duration of the comparator output signal from the beginning of the voltage ramp to the comparator transition varies linearly with signal amplitude. Known reference voltages are converted alternately with the analogue signal. A known minimum is used to correct the reference voltage of the comparator, while a known maximum is used to correct the slope of the voltage ramp.

INVENTOR.
LEWIS J. NEELANDS
BY R H Quist
ATTORNEY.

INVENTOR.
LEWIS J. NEELANDS
BY
ATTORNEY

ANALOG TO PULSE DURATION CONVERTER

BACKGROUND OF THE INVENTION

This invention relates to an analogue to pulse duration converter having calibrating means.

Transducers are commonly employed which convert a physical measurement to an analogue signal such as a voltage, the magnitude of which varies with changes in the measurement. Frequently it is necessary to transmit the measurement information to a remote point by wire or radio. The fact that an analogue signal is subject to degradation in transmission has resulted in a number of methods to convert it to another type of signal more susceptible of accurate transmission.

Such a conversion has been performed by charging a capacitor to the analogue signal voltage, and then linearly discharging the capacitor by a constant current with the resulting voltage ramp applied as one input to a comparator. The comparator output changes state when the voltage ramp passes through a reference voltage applied to the other input of the comparator. The duration of the comparator output signal from the beginning of the voltage ramp to the comparator transition varies linearly with the amplitude of the analogue signal. The pulse duration signal thus produced may be used to modulate a subcarrier oscillator or encoded into a digital form.

The accuracy of the analogue to pulse duration conversion is determined by how well the constant discharge current and the reference voltage can be maintained. Such quantities generally fluctuate with power supply voltages and environmental conditions such as temperature. One approach to solving this problem has been to add to the conversion circuitry rather elaborate compensation schemes. Aside from the complexity, this approach has the major disadvantage of substantially increasing the number of components which may fail.

SUMMARY OF THE INVENTION

It is an object of this invention to provide an improved analogue to pulse duration converter capable of maintaining an accurate capacitor discharge current and reference voltage.

In a preferred form of the invention, conversions of the analogue signal voltage are alternated with conversions of two fixed voltage references, the minimum and maximum voltages to be handled. The times required for these voltages to reach the reference voltage of the comparator when the circuit is correctly calibrated are known. A clock is set to deliver a short gating pulse at the end of each of these known times to apply the comparator output to one of two capacitors. If the center of the gating pulse coincides with the transition of the comparator, the capacitors will be charged to the average of voltages of the comparator output before and after transition. No correction is necessary or made in this case.

If the comparator transition precedes the center of the gating pulse, a lower voltage than the correct voltage is applied to a capacitor. If the comparator transition occurs after the center of the gating pulse, a higher voltage than the correct voltage is applied to a capacitor.

When the minimum reference voltage is being converted, the comparator output voltage is gated to a capacitor associated with the comparator reference voltage input to correct this reference voltage when necessary; i.e., when the correct voltage was not applied to this capacitor.

When the maximum reference voltage is being converted, the comparator output voltage is gated to a capacitor associated with the constant discharge current to adjust this current if necessary. An adjustment in this current causes a change in the voltage ramp applied to the comparator.

DESCRIPTION OF THE PREFERRED EMBODIMENT

Figure 1:
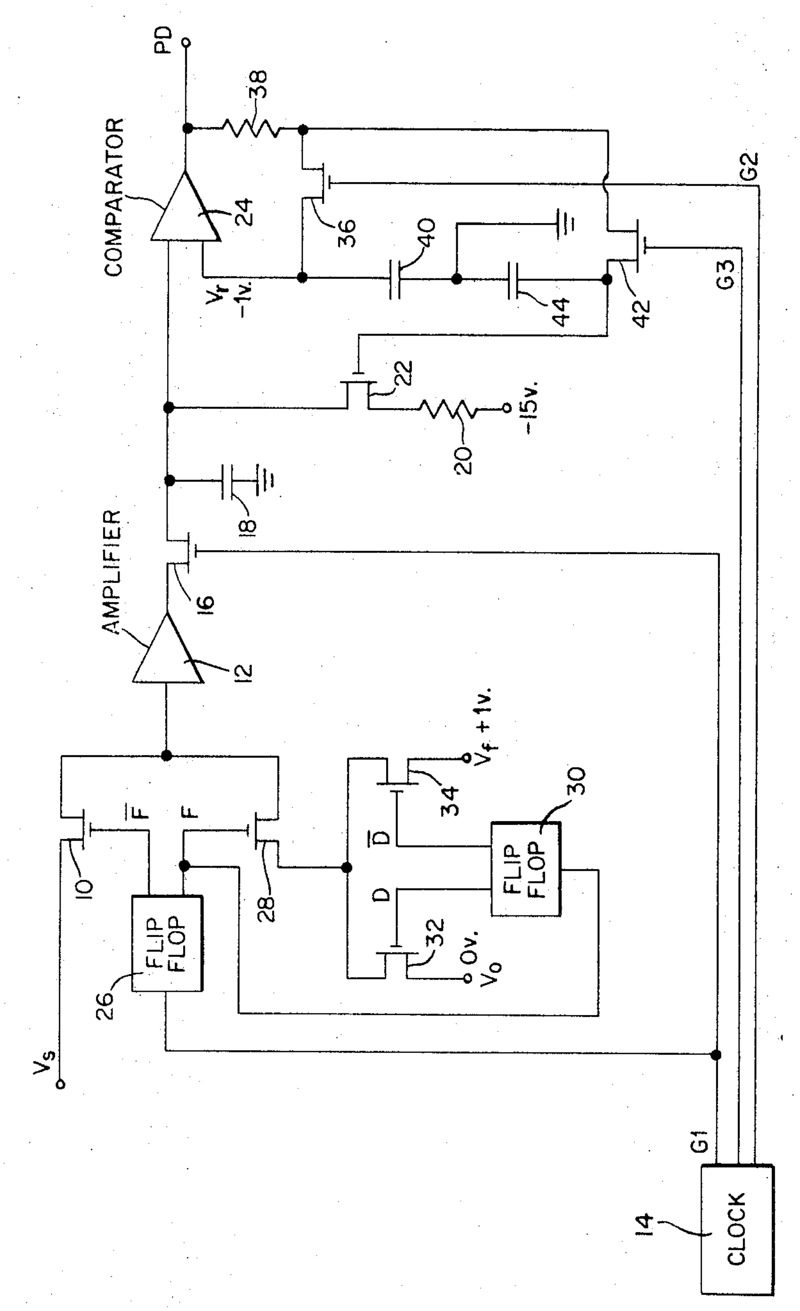
FIG. 1 is a schematic circuit diagram of an embodiment of the analogue to pulse duration converter of this invention.
Figure 2:
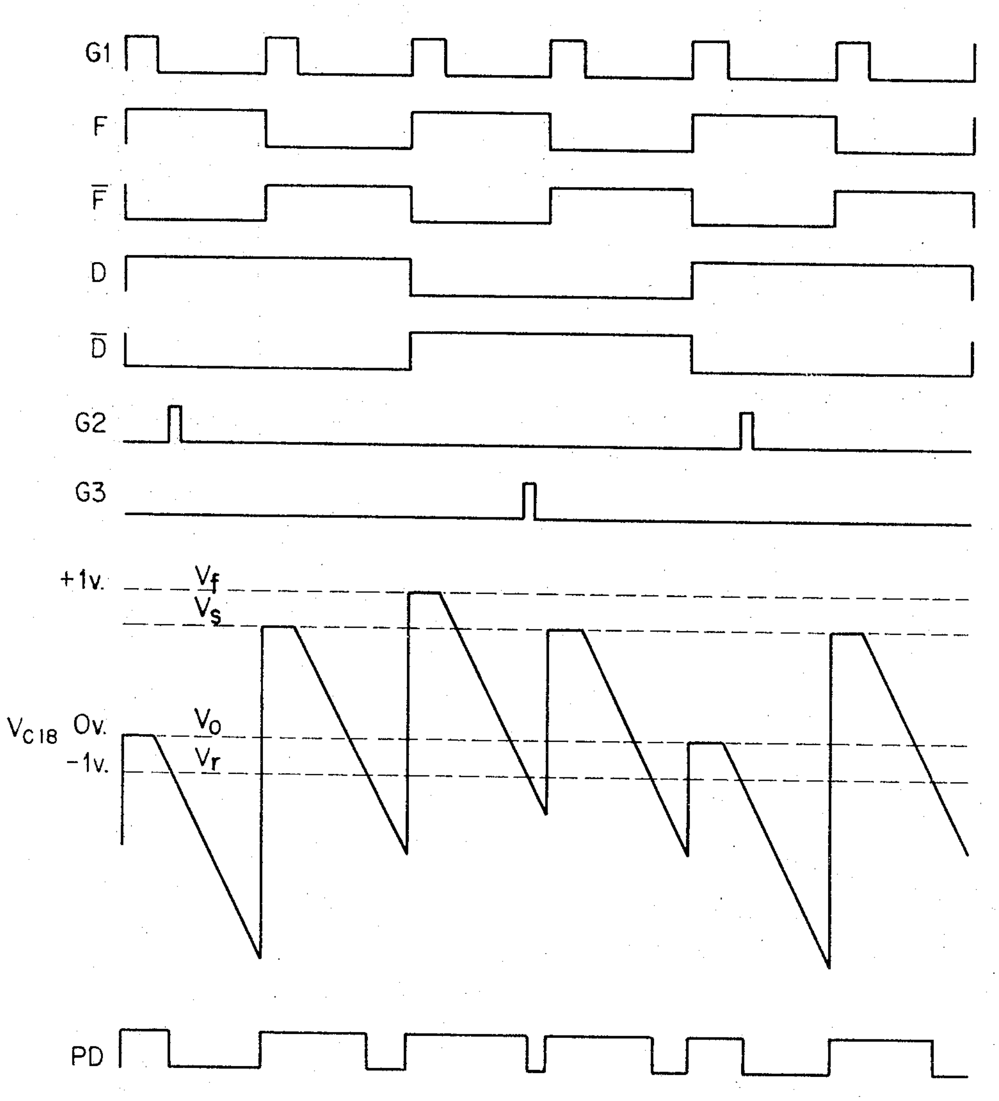
FIG. 2 is a plot of waveforms at various points in the circuit of FIG. 1.

Referring to FIG. 1, analogue input signal $V_s$ is applied through field effect transistor 10 to direct coupled amplifier 12 which amplifies the signal to a convenient working level. Clock circuit 14 periodically generates a gating pulse G1 which is applied to the gate of field effect transistor 16 causing capacitor 18 to become charged to the output voltage of amplifier 12. (The waveforms associated with the circuit of FIG. 1 are shown in FIG. 2.)

Capacitor 18 is linearly discharged beginning at the end of gating pulse G1 by a constant current from a voltage source through resistor 20 and field effect transistor 22. The resulting voltage ramp is applied to one input of comparator 24, with a reference voltage $V_r$ applied to the other input. The comparator output changes state when the ramp voltage passes through the reference voltage. Hence, the time measured from the beginning of the ramp to the comparator transition varies linearly with signal amplitude.

In accordance with the invention, in addition to the analogue input signal $V_s$, calibrating analogue signals $V_o$ and $V_f$ (the minimum and maximum input voltages respectively to be handled) are periodically applied to amplifier 12. $V_o$ and $V_f$ may be, for example, 0 volts and 1 volt respectively, then $V_s$ would be some value between these limits.

Gating pulse G1 is applied to flip-flop 26 which produces outputs F and $\overline{F}$ having half the original frequency. These signals are applied to the gates of field effect transistors 10 and 28. The signal F is also an input to flip-flop 30 which produces outputs D and $\overline{D}$ having half the frequency of the input F. The signals D and $\overline{D}$ are applied to the gates of field effect transistors 32 and 34. Field effect transistor 32 is connected between minimum calibrating voltage $V_o$ and field effect transistor 28, while field effect transistor 34 is connected between maximum calibrating voltage $V_f$ and field effect transistor 28. As illustrated in FIG. 2, capacitor 18 will, during gating signals G1, be charged sequentially by the minimum calibrating voltage $V_o$, the analogue input signal $V_s$, the maximum calibrating voltage $V_f$, and the analogue input signal $V_s$; at which time the sequence repeats.

Since the time required for capacitor 18 to be discharged to the transition state of comparator 24 from the minimum and maximum calibrating voltages can be identified, clock 14 is set to generate a short pulse G2, the center of which occurs at the desired (or correct) transition time for the minimum calibrating voltage. Similarly, clock 14 is set to deliver a short pulse G3, the center of which occurs at the desired (or correct) transition time for the maximum calibrating voltage. These times, it should be understood, will coincide with the actual transition times when the converter is calibrated correctly.

Pulse G2 is a gating pulse which is delivered to the gate of field effect transistor 36 so as to connect the output of comparator 24 through resistor 38 to capacitor 40 for the duration of this pulse. If the voltage at the output of comparator is V1 before transition, and V2 after transition, the voltage on capacitor 40 will vary from V1 to V2, and depends upon the time of the transition relative to the center of the pulse G2. When the transition properly occurs at the center of pulse G2, the voltage on capacitor 40 will be $(V1+V2)/2$, and no error voltage is developed. If the transition occurs after the center of the pulse G2, it is an indication that the reference voltage $V_r$ is too low (assuming V1 to be greater than V2), and a voltage greater than $(V1+V2)/2$ is applied to capacitor 40 which increases the reference voltage $V_r$ resulting in an earlier and more correct transition. In a similar manner, when the transition occurs before the center of the pulse G2, a lower voltage than $(V1+V2)/2$ is applied to capacitor 40 and becomes the reference voltage $V_r$. Thus the time of transition will occur later. By the foregoing arrangement, corrections are made when necessary to maintain the comparator reference voltage $V_r$ at the proper level.

Pulse G3 is a gating pulse which is delivered to the gate of field effect transistor 42 so as to connect the output of comparator 24 to capacitor 44 to develop an error voltage on this capacitor. In this case, if the transition of comparator 24 occurs after the center of pulse G3, it indicates that capacitor 40 is being discharged too slowly; i.e., the slope of the voltage ramp is not sufficiently pronounced. A higher voltage output from comparator 24 results under this situation than would be produced if the transition of comparator 24 coincided with the center of pulse G3. This error voltage on capacitor 44 is applied to the gate of field effect transistor 22 to increase the discharging current flow and thereby adjust the slope of the voltage ramp.

On the other hand, if the transition of comparator 24 occurs before the center of pulse G3, capacitor 40 is being discharged too rapidly. A lower voltage than (V1 +V2)/2 is produced by comparator 24 and applied to capacitor 44. This voltage is applied to the gate of field effect transistor 22 to decrease the discharging current flow. By this approach, this discharge current (and the voltage ramp slope) is regulated as necessary to the correct value.

The voltages on capacitors 40 and 44 are maintained between calibration cycles, there being very little leakage of current through the field effect transistors. By using control loops of high gain, the minimum and maximum reference conversions will maintain the comparator reference voltage and discharge current accurately despite unfavorable environmental conditions.

It will be noted that the output PD of comparator 24 has durations which include the duration of gating pulse G1. Since this is a constant quantity it presents no problem in interpretation of the signal, but it could also be removed prior to transmission.

Obviously the various levels indicated on FIG. 2 are only illustrative, and for example, a positive going voltage ramp might be employed rather than the negative going ramp illustrated. The same calibrating or correcting techniques may also be employed in converters where the unknown analogue signal voltage is used as one input to the comparator, and a capacitor is charged (or discharged) from a reference voltage to the signal voltage, with the resulting voltage ramp applied as the other comparator input.

While a particular embodiment of an analogue to pulse duration converter has been shown and described, it will be obvious that changes and modifications can be made without departing from the spirit of the invention and the scope of the appended claims.

I claim:

1. In an analogue to pulse duration converter employing a comparator having first and second inputs, and producing a first output when its first input is larger than its second, and producing a second output when its second input is larger than its first, and having a transition from one output to the other when its two inputs become equal, a capacitor, means for bringing said capacitor to a first voltage level, a source of current for changing the charge on said capacitor from said first voltage level to a second voltage level in a linear manner thereby producing a voltage ramp, said voltage ramp being applied as one input to said comparator, a voltage at said second level being applied as the second input to said comparator. One of said first and second levels being a known reference voltage and the other being an unknown analogue signal voltage, the improvement comprising:

means to periodically apply a known analogue signal voltage to said converter in lieu of said unknown analogue signal voltage;

means to produce an error signal when said comparator undergoes its transition at a time after said known analogue signal voltage is applied to said converter other than at the center of a clock pulse; and means responsive to said error signal to correct the current for changing the charge on said capacitor.

2. An analogue to pulse duration converter in accordance with claim 1 wherein said means responsive to said error signal comprises:

regulating means connected between said source of current and said capacitor for changing said current;

said regulating means having a control terminal responsive to voltage levels; and a capacitor for receiving said error signal connected to said control terminal.

3. In an analogue to pulse duration converter employing a comparator having first and second inputs, and producing a first output when its first input is larger than its second, and producing a second output when its second input is larger than its first, and having a transition from one output to the other when its two inputs become equal, a capacitor, means for bringing said capacitor to a first voltage level, a source of current for changing the charge on said capacitor from said first voltage level to a second voltage level in a linear manner thereby producing a voltage ramp, said voltage ramp being applied as one input to said comparator, a voltage at said second level being applied as the second input to said comparator, one of said first and second levels being a known reference voltage and the other being an unknown analogue signal voltage, the improvement comprising:

means to periodically apply first and second known analogue signal voltages to said converter in lieu of said unknown analogue signal voltage;

means to produce a first error signal when said comparator undergoes its transition at a time after said first known analogue signal is applied to said converter other than at the center of a first clock pulse;

means responsive to said first error signal to correct the current for changing the charge on said capacitor;

means to produce a second error signal when said comparator undergoes its transition at a time after said second known analogue signal is applied to said converter other than at the center of a second clock pulse; and means responsive to said second error signal to correct said reference voltage.

4. An analogue to pulse duration converter in accordance with claim 3 wherein said means responsive to said first error signal comprises:

regulating means connected between said source of current and said capacitor for changing said current;

said regulating means having a control terminal responsive to voltage levels; and a capacitor for receiving said first error signal connected to said control terminal.

5. A self calibrating converter for converting analogue signals into pulses having durations linearly proportional to the amplitude of the analogue signals comprising:

an input terminal for receiving unknown analogue signals;

an output terminal for delivering pulse duration signals, a source of first and second known analogue signals;

a first capacitor;

means for alternately connecting said unknown and said first and second known analogue signals to said first capacitor for a time sufficient for said first capacitor to become charged to the respective voltage levels of said analogue signals;

a source of current connected to said first capacitor for changing the charge on said capacitor in a linear manner thereby producing a voltage ramp;

a comparator having first and second inputs, and producing a first output when its first input is larger than its second, and producing a second output when its second input is larger than its first, and having a transition from one output to the other when its two inputs become equal;

a second capacitor charged to a reference voltage connected as one input to said comparator, and said voltage ramp being applied as the other input to said comparator;

a clock producing a first short gating pulse having its center occurring at the time when said comparator should have its transition after said first capacitor has been charged to the voltage level of said first known analogue signal;

regulating means connected between said source of current and said first capacitor for changing said current;

said regulating means having a control terminal responsive to voltage levels;

a third capacitor connected to said control terminal;

a first field effect transistor connected between the output of said comparator and said third capacitor, and having a gate electrode;

means to apply said first short gating pulse to the gate electrode of said first field effect transistor;

said clock also producing a second short gating pulse having its center occurring at the time when said comparator should have its transition after said first capacitor has been charged to the voltage level of said second known analogue signal;

a second field effect transistor connected between the output of said comparator and said second capacitor, and having a gate electrode; and means to apply said second short gating pulse to the gate electrode of said second field effect transistor.